is

(12) United States Patent
Carlson et al.

(10) Patent No.: US 12,359,014 B2
(45) Date of Patent: Jul. 15, 2025

(54) ONE-PART POLYURETHANE SEALANT FOR LOW TEMPERATURE APPLICATIONS

(71) Applicant: SIKA TECHNOLOGY AG, Baar (CH)

(72) Inventors: Allison Carlson, Lyndhurst, NJ (US); Hong Yao, Boonton, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 578 days.

(21) Appl. No.: 17/760,538

(22) PCT Filed: Oct. 8, 2020

(86) PCT No.: PCT/EP2020/078305
§ 371 (c)(1),
(2) Date: Mar. 15, 2022

(87) PCT Pub. No.: WO2021/069605
PCT Pub. Date: Apr. 15, 2021

(65) Prior Publication Data
US 2022/0356295 A1    Nov. 10, 2022

(30) Foreign Application Priority Data
Oct. 9, 2019  (EP) .................................... 19202313

(51) Int. Cl.
*C08G 18/28* (2006.01)
*C08G 18/30* (2006.01)
*C08G 18/48* (2006.01)

(52) U.S. Cl.
CPC ..... *C08G 18/4825* (2013.01); *C08G 18/2865* (2013.01); *C08G 18/307* (2013.01); *C08G 18/485* (2013.01); *C08G 2150/00* (2013.01); *C08G 2170/00* (2013.01); *C08G 2190/00* (2013.01)

(58) Field of Classification Search
CPC ............ C08G 18/4825; C08G 18/2865; C08G 18/307; C08G 18/485
See application file for complete search history.

(56) References Cited

U.S. PATENT DOCUMENTS

| 2006/0079661 | A1* | 4/2006 | Zhu .................... C09J 175/08 528/44 |
| 2015/0166859 | A1 | 6/2015 | Choffat et al. |
| 2018/0305597 | A1* | 10/2018 | Yao .................... C08G 18/4841 |
| 2018/0334600 | A1 | 11/2018 | Schlumpf |
| 2022/0041838 | A1* | 2/2022 | Kramer .................... C09K 3/10 |

FOREIGN PATENT DOCUMENTS

JP          59109553 A   *   6/1984

OTHER PUBLICATIONS

JP-59109553_Jun. 25, 1984_English.*
Dec. 22, 2020 International Search Report issued in International Patent Application No. PCT/EP2020/078305.
Dec. 22, 2020 Written Opinion of the International Searching Authority issued in International Patent Application No. PCT/EP2020/078305.

* cited by examiner

*Primary Examiner* — Michael L Leonard
(74) *Attorney, Agent, or Firm* — Oliff PLC

(57) ABSTRACT

An one-part polyurethane composition, including: A) 15-75 wt.-% of at least one isocyanate-functional polyurethane polymer; B) 5-30 wt.-% of at least one organic thixotropy agent; C) 2-25 wt.-% of at least one plasticizer having viscosity of less than 500 mPa s, measured at 0° C. with cone-plate viscosimeter, shear rate 10 $s^{-1}$, cone angle 1°, spindle 25-2, and cone tip-plate distance of 0.05 mm; D) 0-15 wt.-% of at least one solvent; E) 0-50 wt.-% of at least one filler; F) at least one catalyst for curing of polyurethane compositions; wherein isocyanate-functional polyurethane polymer has NCO content in range of 0.8%-2.5% by weight and is obtained from reaction of methylene diphenyl diisocyanate (MDI) and polyol in NCO/OH ratio of at least 3/1 and subsequent removal of non-reacted MDI; and polyol has viscosity, measured according to ASTM D4878-15 at 25° C., of less than 2000 mPa s; and isocyanate-functional polyurethane polymer has remaining content of MDI of at most 0.5% by weight.

14 Claims, No Drawings

ONE-PART POLYURETHANE SEALANT FOR LOW TEMPERATURE APPLICATIONS

TECHNICAL FIELD

The invention relates to one-component, moisture-curing polyurethane compositions that can be applied and cured at low temperatures and that are suitable as elastic sealants and adhesives.

BACKGROUND OF THE INVENTION

Polyurethane compositions, in particular one-component polyurethane compositions, nowadays find use in various sealing and bonding applications due to their versatile mechanical and adhesion properties. They are especially suitable for elastic sealing and bonding, because, depending on the formulation, they can combine high adhesion strength with resilience and elasticity and, furthermore, due to their single component formulation, they can be easily applied and require no mixing steps.

Generally, such one-component polyurethane compositions are applied in the form of a viscous liquid or paste that cures to a soft elastic, rubberlike or tough solid, mostly by influence of humidity from air. However, their curing behavior is highly temperature-dependent. Especially at low temperatures, i.e. below 5° C., as commonly present in cold climates and especially in outside environments, one-component polyurethane compositions commonly suffer from hampered, sluggish curing and poor application properties. First of all, due to the low temperature, the viscosity of such compositions is significantly increased, which leads to higher extrusion forces required for an application out of a piston gun or automatic applicator. In some cases, the compositions are thickened by such an extent that a proper application is no longer possible or at least very cumbersome.

Furthermore, the lower temperature significantly inhibits curing of the compositions. This is mostly due to the fact that cold air is very dry and a sufficient transport of atmospheric water required for curing into the fresh composition is significantly hindered. Furthermore, the whole curing reaction is slowed down due to lower temperatures. Simply increasing the catalyst amount or using higher reactivity ingredients would not solve the problem, since the low water uptake would still be a limiting factor and furthermore, the storage stability of the compositions at higher temperatures would be significantly reduced.

Therefore, there currently are no broadly used one-component polyurethane compositions for cold climates.

US 2018/305597 for example discloses a one-component polyurethane composition that exhibits high green strength and long open time, as well as high storage stability, but it must be slightly warmed to be applied.

US 2015/166859 as another example teaches an elastic sealant or adhesive composition based on silane-functional polymers and having a high filler content. It has a relatively low viscosity, but cures via silane condensation and is thus not especially suitable for low temperature conditions.

Two-component polyurethanes with separated active ingredients that readily cure upon mixing are used instead, but they are not preferred by users because they require the additional mixing step and a more complex application apparatus.

For example, US 2018/334600 teaches a one- or two-component polyurethane composition especially suitable for fuel contact. Also this disclosure does not teach polyurethane compositions especially suitable for low temperatures. Silicones can be used at low temperatures, since they can be formulated having low viscosity at low temperatures, but they still suffer from slow curing in cold climates and have inherent drawbacks such as poor overpaintability, staining effects, e.g in natural stone substrates, and adhesion limits.

Thus, there is still a need for a one-part polyurethane composition suitable for cold climates, i.e. below 5° C. down to, e.g., −10° C., that combines at such low temperatures the advantages of low viscosity, excellent application properties with low extrusion forces, fast curing and excellent mechanical properties that are not inferior to standard one-component polyurethane compositions.

SUMMARY OF THE INVENTION

It is an object of the present invention, therefore, to provide one-part, moisture-curing polyurethane compositions that has a low temperature-dependency of its viscosity and thus can be easily applied at low temperatures of 5° C. or less, down to at least −10° C., but still has a non-sagging, pasty body when freshly applied, and that exhibits a sufficiently fast curing rate at those low temperatures. Furthermore, the cured composition should possess good mechanical properties for use as an elastic sealant.

Surprisingly it has been found that compositions according to claim 1 achieve this object.

Accordingly, the present invention relates to a one-part polyurethane composition, comprising, based on the total composition:

A) between 15 and 75 wt.-% of at least one isocyanate-functional polyurethane polymer PU;
B) between 5 and 30 wt.-% of at least one organic thixotropy agent TX;
C) between 2 and 25 wt.-% of at least one plasticizer PL having a viscosity of less than 500 mPa s, measured at 0° C. with a cone-plate viscosimeter, shear rate 10 s$^{-1}$, cone angle 1°, spindle 25-2, and a cone tip-plate distance of 0.05 mm;
D) between 0 and 15 wt.-% of at least one solvent SL;
E) between 0 and 35 wt.-% of at least one filler F;
F) at least one catalyst C for the curing of polyurethane compositions;

wherein the isocyanate-functional polyurethane polymer PU has an NCO content in the range of 0.8% to 2.5% by weight; and the isocyanate-functional polyurethane polymer PU is obtained from the reaction of methylene diphenyl diisocyanate (MDI) and a polyol P in an NCO/OH ratio of at least 3/1 and subsequent removal of a major part of the non-reacted MDI by means of a suitable separation process; and said polyol P has a viscosity, measured according to ASTM D4878-15 at 25° C., of less than 2000 mPa s; and the isocyanate-functional polyurethane polymer PU has a remaining content of MDI of at most 0.5% by weight; and at least one, preferably both of the ingredients C) and D) are contained in the composition.

The one-component, moisture-curing composition is suitable as an elastic sealant or adhesive that can be applied at temperatures of 5° C. or less, preferably 0° C. or less, in particular −5° C. or less, for example −10° C., without significant restrictions in terms of extrudability or curing rate.

DETAILED DESCRIPTION OF THE INVENTION

Compound names beginning with "poly", such as polyisocyanate or polyol designate substances, which formally contain, per molecule, two or more of the functional groups occurring in their names. The compound can be a monomeric, oligomeric or polymeric compound. For instance, a polyol is a compound having two or more hydroxyl groups and a polyisocyanate is a compound having two or more isocyanate groups.

The term "polymer" in the present document embraces on the one hand a collective of macromolecules, which, while being chemically uniform, differ in respect of degree of polymerization, molar mass, and chain length, and have been prepared by means of a polymerization reaction (addition polymerization, polyaddition or polycondensation). On the other hand, the term also embraces derivatives of such a collective of macromolecules from polymerization reactions, in other words compounds which are obtained by reactions, such as additions or substitutions, for example, of functional groups on existing macromolecules and which may be chemically uniform or chemically non-uniform. The term further embraces so-called prepolymers, in other words reactive oligomeric preadducts whose functional groups have participated in the synthesis of macromolecules.

The term "polyurethane polymer" embraces all polymers that are prepared by the process known as the diisocyanate polyaddition process. This also includes those polymers that are virtually or entirely free of urethane groups. Examples of polyurethane polymers are polyether-polyurethanes, polyester-polyurethanes, polyether-polyureas, polyureas, polyester-polyureas, polyisocyanurates, and polycarbodiimides.

The average molecular weight is understood to mean the number average molecular weight, as determined using conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C. "Room temperature" refers to a temperature of 23° C. "Relative humidity", abbreviated "r.h." and expressed in percent, describes, according to general knowledge, the amount of gaseous water in a respective atmosphere relative to the saturation amount at a given temperature and under normal ambient pressure.

Weight percent, abbreviated "wt.-%", describes a percentage amount of an individual component of a composition, based on the total weight of the composition if not explicitly described otherwise. "Weight" and "mass" are used interchangeably in this document.

All industrial norms or standards mentioned in this document are referring to the respective current version at the time of filing, if not otherwise specified.

The composition used according to the invention is a one-part or single component composition, i.e. the composition comprises one component.

Optionally however, one or more additional components may be included for specific purposes. For instance, an additional component comprising coloring agents such as pigments may be used for coloring purposes.

Polyurethane Polymer PU

The inventive one-part polyurethane composition comprises as a first essential component between 15 and 75 wt.-%, preferably between 20 and 50 wt.-%, based on the total weight of the composition, of at least one isocyanate-functional polyurethane polymer PU.

Said at least one isocyanate-functional polyurethane polymer PU has an NCO content in the range of 0.75% to 2.5% by weight, preferably 1.0% to 2.0% by weight, more preferably 1.3% to 1.9% by weight. This range allows for a proper curing of the polyurethane polymer under influence of moisture.

Furthermore, the isocyanate-functional polyurethane polymer PU is obtained from the reaction of methylene diphenyl diisocyanate (MDI) and a polyol P in an NCO/OH ratio of at least 3/1 and subsequent removal of a major part of the non-reacted MDI by means of a suitable separation process. This aspect is discussed more detailed further below.

Lastly, the isocyanate-functional polyurethane polymer PU has a remaining content of MDI of at most 0.5% by weight. This low amount of monomeric MDI has not only advantages in terms of EHS, but also improves the properties of the polyurethane polymer PU.

Polyurethane polymer PU is obtained from the reaction of at least one polyol P and MDI, wherein said polyol P has a viscosity, measured according to ASTM D4878-15 at 25° C., of less than 2000 mPa s, preferably less than 1750 mPa s, more preferably less than 1500 mPa s, in particular less than 1250 mPa s.

Suitable polyols P are, in principle, all customary polyols for the preparation of polyurethane polymers, as long as they have a viscosity in the defined range. Particularly suitable are polyether polyols, polyester polyols, poly(meth)acrylate polyols, polybutadiene polyols, polycarbonate polyols and mixtures of these polyols.

Preference is given to polyether polyols.

Examples of polyether polyols P are polyoxyethylenepolyols, polyoxy-propylenepolyols and polyoxybutylenepolyols, in particular polyoxyethylene-diols, polyoxypropylenediols, polyoxybutylenediols, polyoxyethylenetriols and polyoxypropylenetriols. Polyoxyalkylenediols or polyoxyalkylenetriols having a degree of unsaturation of less than 0.02 meq/g and having an average molecular weight in the range from 1000 to 30000 g/mol and polyoxyethylene-diols, polyoxyethylenetriols, polyoxypropylenediols and polyoxypropylenetriols having an average molecular weight of from 400 to 8000 g/mol are suitable.

The polyether polyols P mentioned above usually have a relatively high molecular weight, for instance, an average molecular weight of from 250 to 30000 g/mol, in particular from 1000 to 15000 g/mol, and/or preferably an average OH functionality in the range from 1.6 to 3. It is possible to use a combination of differently functional polyether polyols P, for example a combination of difunctional polyether polyols having two hydroxyl groups with trifunctional polyether polyols having 3 hydroxyl groups.

The polyether polyol preferably has an average molecular weight Mn in the range from 1000 to 15000 g/mol, more preferably from 1500 to 12000 g/mol, in particular from 2000 to 8000 g/mol.

Further examples of polyether polyols P are so-called ethylene oxide-terminated ("EO-endcapped", ethylene oxide-end-capped) polyoxypropylenepolyols, styrene-acrylonitrile-grafted polyetherpolyols, e.g. Lupranol® from BASF Polyurethanes GmbH, Germany.

The polyol P, preferably polyether polyol P, preferably has an OH number in the range of 8 to 112 mg KOH/g, more preferably in the range of 10 to 75 mg KOH/g, in particular in the range of 12 to 56 mg KOH/g.

The polyol P, preferably polyether polyol P, preferably has an average OH functionality in the range from 1.6 to 3.

Suitable polyether polyols P are polyoxyalkylene diols and/or polyoxyalkylene triols, in particular polymerization products of ethylene oxide or 1,2-propylene oxide or 1,2- or 2,3-butylene oxide or oxetane or tetrahydrofuran or mixtures thereof, which may be polymerized with the aid of a starter molecule having two or three active hydrogen atoms, in particular a starter molecule such as water, ammonia or a compound having several OH or NH groups such as 1,2-ethanediol, 1,2- or 1,3-propanediol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, 1,3- or 1,4-cyclohexanedimethanol, bisphenol A, hydrogenated bisphenol A, 1,1,1-trimethylolethane, 1,1,1-trimethylolpropane, glycerol or aniline, or mixtures of the abovementioned compounds.

Particularly preferred are polyoxypropylene diols, polyoxypropylene triols, or ethylene oxide-terminated polyoxypropylene diols or triols. These are polyoxyethylene polyoxypropylene mixed polyols which are obtained, in particular, by further alkoxylating polyoxypropylene diols or triols after completion of the polypropoxylation reaction with ethylene oxide and thereby having primary hydroxyl groups.

Preferred polyether polyols P have a degree of unsaturation of less than 0.02 meq/g, especially less than 0.01 meq/g.

In some preferred embodiments, polyether polyol P comprises at least two different polyether polyols P1 and P2. In an especially preferred embodiment, polyether polyol P1 is a bifunctional polyol and polyether polyol P2 is a trifunctional polyol.

In a preferred embodiment of the one-part polyurethane composition according to the present invention, said polyol P comprises a polyether diol and/or a polyether triol.

Additional to the above-mentioned essential polyols, small amounts of low molecular weight di- or polyhydric alcohols, e.g., with a molecular weight of less than 250 g/mol, may be optionally used in the inventive composition. Examples thereof are 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

In one preferred embodiment the polyether polyol P is a trimethylolpropane- or, in particular, glycerol-started, optionally ethylene oxide-terminated polyoxypropylene triol having an OH number in the range of 20 to 42 mg KOH/g, in particular 22 to 35 mg KOH/g, and a average OH functionality in the range of 2.2 to 3.0, preferably 2.2 to 2.8, in particular 2.2 to 2.6.

In a further embodiment, preference is given to a polyoxypropylene diol having an OH number in the range from 8 to 112 mg KOH/g, preferably in the range from 10 to 75 mg KOH/g, in particular in the range from 12 to 56 mg KOH/g.

Additionally, methylene diphenyl diisocyanate (MDI) such as Mondur® M from Bayer is required in the synthesis of the polyurethane polymer PU. It was found that only MDI is suitable as polyisocyanate for the present invention, since other commonly used isocyanates, such as hexamethylene diisocyanate (HDI), isophorone diisocyanate (IPDI), and even toluene diisocyanate (TDI) do not work in the present invention. Curing of the composition at temperatures below 5° C. is not viable with other polyisocyanates than MDI.

Monomeric methylene diphenyl diisocyanate (MDI) is most preferred. A plurality of different product grades of MDI is available and suitable for the present invention. The term "methylene diphenyl diisocyanate" as used in the present invention, includes, depending on its grade, monomeric and polymeric methylene diphenyl diisocyanate and, also depending on its grade, the three different isomers, namely 4,4'-methylene diphenyl diisocyanate (4,4'-MDI), 2,4'-methylene diphenyl diisocyanate (2,4'-MDI), and 2,2'-methylene diphenyl diisocyanate (2,2'-MDI). The nature and different grades of MDI and its commercially available forms are well known to the averagely skilled person in the art.

In the reaction between the (monomeric) MDI and the polyether polyol, the NCO/OH ratio is preferably in the range from 3/1 to 10/1, more preferably in the range from 3/1 to 8/1, in particular in the range from 4/1 to 7.1.

The reaction is preferably carried out with exclusion of moisture at a temperature in the range from 20 to 160° C., in particular from 40 to 140° C., if appropriate in the presence of suitable catalysts.

After the reaction, the monomeric MDI remaining in the reaction mixture is removed to the described residual content by means of a suitable separation process.

Preferred as a separation process is a distillative process, in particular thin-film distillation or short-path distillation, preferably under application of a vacuum. Particularly preferred is a multi-stage process in which the monomeric MDI is removed in a short-path evaporator at a jacket temperature in the range of 120 to 200° C. and a pressure of 0.001 to 0.5 mbar.

In the case of 4,4'-MDI, distillative removal is particularly demanding. For example, it must be ensured that the condensate does not get stuck and the system becomes clogged. Preference is given to run at a jacket temperature in the range of 160 to 200° C. at 0.001 to 0.5 mbar and the removed monomer is condensed at a temperature in the range of 40 to 60° C.

The reaction of the monomeric MDI with the polyol P and the subsequent removal of the majority of the monomeric MDI remaining in the reaction mixture preferably take place without the use of solvents or entraining agents. Preferably, the monomeric MDI removed after the reaction is subsequently reused, i.e. used again for the production of isocyanate-group-containing polyurethane polymer.

In the reaction, the OH groups of polyol P react with the isocyanate groups of the monomeric MDI. It also comes to so-called chain extension reactions by reacting OH groups and/or isocyanate groups of reaction products between polyol and monomeric MDI. The higher the NCO/OH ratio is chosen, the less chain extension reactions take place, and the lower the polydispersity and hence the viscosity of the resulting polymer. A measure of the chain extension reaction is the average molecular weight of the polymer or the width and distribution of the peaks in the GPC analysis. A further measure is the effective NCO content of the monomer-liberated polymer in relation to the theoretical NCO content calculated from the reaction of each OH group with monomeric MDI.

The NCO content of the polyurethane polymer PU is preferably at least 80%, in particular at least 85%, of the theoretical NCO content, which is calculated from the addition of one mole of monomeric MDI per mole of OH groups of the polyol P. Such a polyurethane polymer is of particularly low viscosity and allows moisture-curing polyurethane compositions with particularly good application properties.

A particularly preferred polyurethane polymer PU has an NCO content in the range of 1 to 2.5% by weight, in particular 1.1 to 2.1% by weight, and a content of monomeric MDI of at most 0.3% by weight, in particular at most 0.2% by weight, and is obtained from the reaction of 4,4'-MDI and/or 2,4-MDI with an optionally ethylene oxide-terminated polyoxypropylene triol having an average OH functionality in the range from 2.2 to 3, preferably 2.2 to 2.8, in particular 2.2 to 2.6, and a OH number in the range of 20 to 42 mg KOH/g, in particular in the range of 22 to 35 mg KOH/g. Such a polymer provides a particularly attractive combination of low viscosity, long open time with rapid cure and high ductility and elasticity, and high strength.

Another particularly preferred polyurethane polymer PU has an NCO content in the range from 0.8 to 2.4% by weight, in particular 1.2 to 2.1% by weight, and a content of monomeric MDI of at most 0.3% by weight, in particular not more than 0.2% by weight. %, and is obtained from the reaction of 4,4'-MDI and/or 2,4-MDI with a polyoxypropylene diol having an OH number in the range of 13 to 38 mg KOH/g, in particular 22 to 32 mg KOH/g. Such a polymer is particularly low in viscosity and is particularly suitable for combination with an isocyanate group-containing compound having an NCO functionality of at least 2.2, in particular an oligomeric isocyanate or a corresponding isocyanate group-containing polymer. It allows a particularly high ductility and elasticity.

Another particularly preferred polyurethane polymer PU is a mixture of the two particularly preferred aforementioned polyurethane polymers PU. This mixture allows for a particular beneficial balance of properties, in particular high elasticity and low viscosity.

The moisture-curing polyurethane composition may additionally comprise further isocyanate group-containing polymers, in particular small amounts of conventionally prepared isocyanate group-containing polymers having a higher content of monomeric diisocyanates.

Preferably, the moisture-curing polyurethane composition contains 10 to 70% by weight, particularly preferably 15 to 50% by weight, in particular 20 to 40% by weight, of isocyanate-containing polyurethane polymer PU having a monomeric diisocyanate content of at most 0.5% by weight.

Catalyst C

In preferred embodiments, the inventive one-part polyurethane composition comprises at least one catalyst C for curing isocyanate-functional polyurethanes.

Catalysts C include compounds that accelerate the reaction of the isocyanate groups with hydroxyl and/or amine groups to form urethane bonds and/or urea bonds or the reaction of isocyanate groups with water to form primary amino groups.

Catalysts C which accelerate the reaction of the isocyanate groups with water include, in particular, metal compounds, examples being tin compounds such as dibutyltin diacetate, dibutyltin dilaurate, dibutyltin distearate, dibutyltin diacetylacetonate, dioctyltin dilaurate, dibutyltin dichloride, and dibutyltin oxide, tin(II) carboxylates, stannoxanes such as laurylstannoxane, bismuth compounds such as bismuth(III) octoate, bismuth(III) neodecanoate or bismuth(III) oxinates; and also tertiary amines, examples being 2,2' dimorpholinodiethyl ether and other morpholine ether derivatives, 1,4 diazabicyclo[2.2.2]-octane, and 1,8 diazabicyclo[5.4.0]undec-7-ene.

There may also be combinations of the stated catalysts C present, especially mixtures of tertiary amines and metal compounds.

A typical amount of catalyst C is customarily 0.001% to 2% by weight, based on the overall composition, it being clear to the person skilled in the art what quantities are sensible for which catalysts.

Catalyst C is preferably comprised in the composition with an amount of between 0.004 wt.-% and 2 wt.-%, preferably between 0.01 wt.-% and 1 wt.-%, more preferably between 0.015 wt.-% and 0.55 wt.-%, based on the total weight of the composition. These amounts refer to the pure catalyst, and not a catalyst solution containing the catalyst dissolved or dispersed in a carrier substance.

If a combination of a metal compound, preferably a tin complex, and a tertiary amine, preferably 2,2' dimorpholino diethyl ether (DMDEE), is used, the metal compound is preferably comprised in the composition with an amount of between 0.001 wt.-% and 1.0 wt.-%, preferably between 0.002 wt.-% and 0.55 wt.-%, based on the total weight of the composition, and the tertiary amine is preferably comprised in the composition with an amount of between 0.001 wt.-% and 0.5 wt.-%, preferably between 0.002 wt.-% and 0.4 wt.-%, based on the total weight of the composition.

Filler F

The composition may furthermore contain at least one filler F. Suitable fillers include all fillers commonly used in polyurethane compositions, without any special restrictions. Fillers add the advantages of lower costs for the compositions, and at the same time may improve mechanical or handling properties. The filler F advantageously influences, for example, both the consistency of the uncured composition and the mechanical properties of the cured composition.

Suitable fillers F include organic and inorganic fillers, examples being natural, ground or precipitated calcium carbonates, with a coating, optionally, of fatty acids, more particularly stearates; calcined kaolins, aluminum oxides, aluminum hydroxides, barytes ($BaSO_4$, also called heavy spar), silicas, especially highly disperse silicas from pyrolysis processes, carbon blacks, especially industrially produced carbon blacks (referred to herein as "carbon black"), PVC powders or hollow spheres. Preferred fillers are carbon black, chalk, clay powder, and polyvinyl chloride powder.

It may be of advantage to use a mixture of different fillers F. Most preferred is chalk ($CaCO_3$), clay powder, carbon black, PVC powder, or a combination of these fillers.

A suitable amount of filler F is, for example, in the range from 5% to 50% by weight, preferably 10% to 45% by weight, based on the overall composition.

In preferred embodiments of the one-part polyurethane composition according to the present invention, the composition comprises said filler F, preferably one or more selected from the group consisting of carbon black, chalk, clay powder, and polyvinyl chloride powder, with an amount of between 5 and 50 wt.-%, preferably between 10 and 45 wt.-%, more preferably between 15 and 45 wt.-%, based on the total composition.

Thixotropy Additive TX

The inventive one-part polyurethane composition furthermore comprises between 5 and 30 wt.-%, preferably between 10 and 25 wt.-%, of at least one organic thixotropy agent TX.

Suitable organic thixotropy agents include rheology modifiers such as, for example, thickeners or thixotropic additives, examples being urea compounds and polyamide waxes. These compounds advantageously influence the rheology of the composition, by e.g. enabling a higher viscosity under low shear forces, but at the same time enabling a lower viscosity under higher shear forces. This facilitates the application, e.g. by enabling a lower viscosity of the composition during extrusion by force from a container, and improves the non-sagging behavior of the freshly applied composition.

It was found that inorganic thixotropy agents, such as silica or clays, lead to a too high viscosity at low temperatures and thus are not suitable for the invention.

In preferred embodiments of the one-part polyurethane composition according to the present invention, said organic thixotropy agent TX is obtained from the reaction of a diisocyanate with a monoalkyl amine and wherein said thixotropy agent TX is essentially free of isocyanate groups.

In especially preferred embodiments of the one-part polyurethane composition according to the present invention, said thixotropy agent TX is the reaction product of MDI and N-butylamine, suspended in a plasticizer.

Such a reaction product should be manufactured in a way that it does not comprise anymore isocyanate groups in significant amounts, i.e. by using a slight molar excess of primary amino groups with respect to isocyanate groups. A suitable molar excess is, for example, 1 to 10%.

The inventive one-part polyurethane composition furthermore comprises at least one, preferably both of:

between 2 and 25 wt.-%, preferably between 5 and 20 wt.-%, more preferably between 7 and 15 wt.-%, of at least one plasticizer PL having a viscosity of less than 500 mPa s, measured at 0° C. with a cone-plate viscosimeter, shear rate 10 s$^{-1}$, cone angle 1°, spindle 25-2, and a cone tip-plate distance of 0.05 mm, and between 0 and 15 wt.-%, preferably between 1 and 10 wt.-%, more preferably between 2 and 7 wt.-%, of at least one solvent SL.

Either one, preferably both, of plasticizer PL and solvent SL must be present in the composition according to the invention. Depending on the properties and amount of plasticizer PL and/or solvent SL, these substances can be used alone or in combination.

Plasticizer PL

Plasticizers are additives that increase the plasticity or decrease the viscosity of a material. In comparison with solvents, plasticizers have a much lower volatility and higher boiling point. In the meaning of the present document, plasticizers are liquid substances having a boiling point of greater than 250° C. at standard pressure and/or a vapor pressure of less than 0.1 mbar at 20° C.

Suitable plasticizers include for example commercially available esters of organic carboxylic acids or their anhydrides, for example, fatty acid esters, adipates such as dioctyl adipate (DOA), diisodecyl adipate (DIDA), cyclohexane esters, such as diisononyl cyclohexane-1,2-dicarboxylate, azelates and sebacates; and organic phosphoric and sulfonic acid esters. It is also possible to use polyesters, for example polyesters of adipic acid or sebacic acid with diols, for example hexanediol or butanediol, with the proviso that these polyesters are liquid at room temperature.

Furthermore, esters of carboxylic acids with polyethylene glycols or polypropylene glycols are suitable.

Further suitable esters are organic phosphonates and phosphates.

Also suitable are cyclic esters, such as lactones.

Also suitable as plasticizer PL are linear or branched ether compounds having one or two ether functions which bridge C2 to C12 alkyl radicals and which optionally contain ester functions.

Furthermore suitable as ethers are alkoxy-terminated polyols, in particular alkoxy-terminated polyoxyalkylene polyols, and also alkoxy-terminated polyether polyols, with endcapped OH groups. Examples of these are polypropylene glycol dialkyl ethers or polyethylene glycol dialkyl ethers. Examples thereof are tetraglyme (tetraethylene glycol dimethyl ether), pentaglyme (pentaethylene glycol dimethyl ether), hexaglyme (hexaethylene glycol dimethyl ether), polyethylene glycol dimethyl ether, for example as are commercially sold by Clariant under the name polyglycol DME 200 or polyglycol DME 250, diethylene glycol dibutyl ether, polypropylene glycol dimethyl ether, polyproroylene glycol dibutyl ether, Polyethylene glycol monomethyl ether monoacetate and polypropylene glycol monomethyl ether monoacetate. Polypropylene glycol diethers have the advantage over the corresponding polyethylene glycol diethers that they are typically still liquid via better solution behavior and at higher molecular weights.

Suitable plasticizers must fulfill the condition of having a viscosity of less than 500 mPa s, measured at 0° C. with a cone-plate viscosimeter, shear rate 10 s$^{-1}$, cone angle 1°, spindle 25-2, and a cone tip-plate distance of 0.05 mm.

Thus, many commercially important plasticizers such as phthalates, e.g. DIDP or DINP, do not work in the present invention, since their viscosity is too high and outside the defined range.

It is possible that the composition furthermore contains other plasticizers that are not according to the definition above. These, however, are not regarded as plasticizers PL according to the definition of this invention. Such further plasticizers are preferably comprised in the composition with amounts of less than 20 wt.-%, preferably less than 15 wt.-%, based on the total composition.

In preferred embodiments of the one-part polyurethane composition according to the present invention, said plasticizer PL is contained in the composition with an amount of between 4 and 20 wt.-%, preferably between 5 and 15 wt.-%, based on the total composition.

In preferred embodiments of the one-part polyurethane composition according to the present invention, said plasticizer PL has a polyether structure having no functional groups that spontaneously react with isocyanates and/or water.

In other preferred embodiments of the one-part polyurethane composition according to the present invention, said plasticizer PL is an ester of a linear, branched, or cyclic aliphatic polyol that optionally contains ether groups, wherein all hydroxyl groups are converted to ester groups.

In preferred embodiments of the one-part polyurethane composition according to the present invention, said plasticizer PL is a polyether having blocked hydroxyl groups and is free of isocyanate groups. This preferred embodiment is explained in more details below.

The hydroxyl groups of this polyether are in particular blocked in such a way that it does not undergo any chemical reactions before and during the curing of the polyurethane composition, i.e. remains unchanged in the cured composition.

Preferably, this polyether having blocked hydroxyl groups has a viscosity at 20° C. in the range of 50 to 500 mPa s. The viscosity is determined using a cone-plate viscometer with a cone diameter of 25 mm, cone angle 1°, cone-tip-to-plate distance 0.05 mm at a shear rate of 10 s$^{-1}$.

Preferably, the blocked hydroxyl groups are selected from ester, aceto-ester, carbonate, acetal and urethane groups. Preference is given to ester, acetoester, carbonate or urethane groups. Hydroxyl groups are particularly easy to chemically convert into these groups, and these groups are particularly stable and compatible with polyether urethane polymers.

Particular preference is given to ester, carbonate or urethane groups, in particular ester or urethane groups.

Most preferred are ester groups, especially acetate groups. These allow a particularly low viscosity and are easily accessible.

Particular preference is given to an ester group, in particular an ester group having 1 to 8 C atoms, in particular an acetate group or benzoate group. These are particularly easy to produce.

Most preferred is an acetate group. A polyether having blocked hydroxyl groups in the form of acetate groups is particularly low-viscosity, very easy to prepare and particularly inexpensive.

Further preferred is a urethane group, in particular a phenyl urethane group or a p-toluene sulfonyl urethane group. A polyether having such blocked hydroxyl groups has a sufficiently low viscosity and is particularly easy to prepare.

Preferred as aceto ester group is an aceto acetate group, but only in the event that the composition is free of blocked, releasable by hydrolysis amines.

Preferably as a carbonate group, a methyl carbonate group.

Preferred as the acetal group is a 1,4-dimethyl-2-oxapentoxy group, a 2-oxa-cyclopentyloxy group or a 2-oxa-cyclohexyloxy group, especially a 1,4-dimethyl-2-oxa-pentoxy group.

The polyether having blocked hydroxyl groups preferably has as repeating units 1,2-ethyleneoxy, 1,2-propyleneoxy, 1,3-propyleneoxy, 1,2-butyleneoxy or 1,4-butyleneoxy groups, in particular 1,2-propyleneoxy groups.

Preferably, at least 70%, in particular at least 80%, of the repeating units are composed of 1,2-propyleneoxy groups and optionally at most 30%, in particular at most 20%, of the repeating units of 1,2-ethyleneoxy groups.

Particularly preferably, the repeat units consist of 100% 1,2-propyleneoxy groups. This allows polyurethane compositions with particularly good hydrolysis resistance.

The polyether having blocked hydroxyl groups is particularly preferably derived from a hydroxy-functional polyether having an average OH functionality in the range from 1 to 3, in particular 1 to 2.

Suitable as hydroxy-functional polyether having an OH functionality of 1 are in particular so-called polyoxypropylene monols.

Preferred starters for polyoxypropylene monols are methanol, ethanol, propanol, isopropanol, butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol, in particular methanol, ethanol or butanol, most preferably butanol.

Suitable as hydroxy-functional polyethers with an OH functionality of >1 are in particular so-called polyoxypropylene polyols.

Preferred starters for polyoxypropylene polyols are 1,2-ethanediol, 1,2-propanediol, 1,3-propanediol, 1,4-butanediol, trimethylolpropane, glycerol, pentaerythritol, 1,2,3,4-butanetetrol (threit or erythritol), 1,2,3,4,5-pentanepentol (xylitol) or 1,2,3,4,5,6-hexanhexol (mannitol or sorbitol), more preferably 1,2-ethanediol, 1, 2-propanediol, 1,3-propanediol, 1,4-butanediol, trimethylolpropane, or glycerol, especially 1,2-propanediol or glycerol, most preferably 1,2-propanediol.

The polyether having blocked hydroxyl groups preferably has an average molecular weight $M_n$ in the range from 600 to 15,000 g/mol, more preferably from 700 to 10,000 g/mol, more preferably from 900 to 5,000 g/mol, in particular from 900 to 2,500 g/mol, as determined by gel permeation chromatography (GPC) against polystyrene as standard with tetrahydrofuran as the mobile phase, refractive index detector and evaluation upwards of 200 g/mol.

This leads to moisture-curing polyurethane compositions with particularly high ductility and elasticity. In particular, such compositions have a long processing time (open time) with rapid curing and high cold flexibility.

In a preferred embodiment, the polyether having blocked hydroxyl groups is derived from a butanol-initiated polyoxypropylene monol having an OH number in the range of 25 to 90 mg KOH/g, preferably in the range of 50 to 80 mg KOH/g. This leads to moisture-curing polyurethane compositions with particularly good processability and very high low-temperature flexibility. The blocked hydroxyl group preferably stands for an acetate group.

In a further preferred embodiment, the polyether having blocked hydroxyl groups is derived from a polyoxypropylene diol having an OH number in the range of 12 to 125 mg KOH/g, preferably in the range of 22 to 125 mg KOH/g, in particular in the range of 45 to 125 mg KOH/g. This leads to moisture-curing polyurethane compositions with very good processability and good cold flexibility. The blocked hydroxyl groups are preferably acetate groups.

In a further preferred embodiment, the polyether having blocked hydroxyl groups is derived from a trimethylolpropane or, in particular, glycerol-initiated, optionally ethylene oxide-terminated polyoxypropylene triol having an average OH functionality in the range from 2.2 to 3 and an OH number in the range from 22 to 56 mg KOH/g.

The polyether having blocked hydroxyl groups is obtained in particular by reacting at least one hydroxy-functional polyether with at least one suitable blocking agent for hydroxyl groups.

For the reaction, the blocking agent is used at least stoichiometrically with respect to the hydroxyl groups. For blocking customary processes are used for the respective reactive groups, optionally with the concomitant use of catalysts or solvents. If split-off agents are formed in the blocking reaction, they are preferably removed from the reaction mixture by a suitable method, in particular by distillation.

Suitable blocking agents are nucleophilic compounds which undergo an addition or substitution reaction with hydroxyl groups.

Particularly suitable are carboxylic acids, carboxylic acid chlorides, carboxylic acid esters or carboxylic anhydrides, diketene, 2,2,5-trimethyl-4H-1,3-dioxin-4-one, tert-butyl acetoacetate, dialkyl carbonates, monoisocyanates, (meth)acrylamides, methylene malonates or cyanoacrylates.

Preference is given to carboxylic acids, carboxylic acid chlorides, carboxylic esters or carboxylic anhydrides, with blocked hydroxyl groups being formed in the form of ester groups. Of these, preference is given to carboxylic acid anhydrides or carboxylic acid esters, in particular acetic anhydride.

In the case of acetic anhydride as a blocking agent, acetic acid is distilled off in the reaction to form blocked hydroxyl groups in the form of acetate groups. In the case of isopropenyl acetate as blocking agent, acetone is distilled off during the reaction, resulting in blocked hydroxyl groups in the form of acetate groups.

Preference is furthermore given to diketene, 2,2,5-trimethyl-4H-1,3-dioxin-4-one or sterically hindered small acetoesters, in particular tert-butyl acetoacetate, in which blocked hydroxyl groups are formed in the form of acetoester groups.

Preference is furthermore given to dialkyl carbonates, where blocked hydroxyl groups are formed in the form of carbonate groups.

Also preferred are monoisocyanates, wherein blocked hydroxyl groups are formed in the form of urethane groups. Preference is given to phenyl isocyanate or p-toluenesulfonyl isocyanate.

Suitable hydroxy-functional polyethers are in particular those having an OH functionality in the range from 1 to 3 and an average molecular weight Mn in the range from 600 to 15,000 g/mol, particularly preferably 700 to 10,000 g/mol, more preferably 900 to 5,000 g/mol, in particular 900 to 2,500 g/mol.

Preference is given to polyoxypropylene monols having an OH number in the range from 25 to 90 mg KOH/g, preferably in the range from 50 to 80 mg KOH/g, in particular alcohol-initiated polyoxypropylene monols, in particular starting from methanol, ethanol, Propanol, isopropanol, butanol, isobutanol, tert-butanol, pentanol, hexanol, 2-ethylhexanol, lauryl alcohol, myristyl alcohol, palmityl alcohol, allyl alcohol, cyclohexanol, benzyl alcohol or phenol. Of these, preference is given to alkyl alcohol-initiated polyoxypropylene monols, in particular starting from methanol, ethanol or butanol. Particular preference is given to butanol-initiated polyoxypropylene monols having an average molecular weight Mn in the range from 650 to 2,000 g/mol, in particular from 700 to 1,500 g/mol. Butanol-initiated polyoxypropylene monols are commercially available, for example as Synalox® 100-20B, Synalox® 100-40B or Synalox® 100-85B (all from Dow).

Preference is furthermore given to polyoxypropylene diols having an OH number in the range from 12 to 125 mg KOH/g, preferably in the range from 22 to 125 mg KOH/g, in particular in the range from 45 to 125 mg KOH/g. Also preferred are trimethylolpropane or, in particular, glycerol-started polyoxypropylene triols having an OH number in the range from 22 to 56 mg KOH/g, which optionally contain fractions of 1,2-ethyleneoxy groups.

Solvent SL

Suitable solvents SL are all organic solvents which that have no reactive groups able to react with isocyanates, such as hydroxyl groups. For example, alcohols are not suitable.

In general, it is preferred to use no solvents SL that are toxic or otherwise problematic in terms of EHS.

Suitable solvents SL are, for example, esters of linear, cyclic, or branched C1 to C6-carboxylic acids, in particular mono-carboxylic acids which have been esterified with linear or branched C1 to C6 monoalcohols, and also esters of low-molecular weight alcohols, in particular C1 to C6-alcohols, which have been esterified with carboxylic acids.

Particularly suitable esters are also esters of carbonic acid or monocarboxylic acids or polycarboxylic acids. The esters of carbonic acid in particular the dialkyl carbonates are mentioned.

Also suitable as solvents SL are ketones having linear or branched C1 to C12 alkyl radicals and amides, in particular fatty acid amides or cyclic amides, i.e. lactams.

However, all of these compounds which are used as solvent SL have the proviso that they must be liquid (flowable) at 0° C., preferably at −5° C. in particular at −10° C.

In preferred embodiments of the one-part polyurethane composition according to the present invention, said solvent SL comprises one or more selected from the group consisting of aliphatic or aromatic hydrocarbons, aliphatic carboxylic acid esters, ethers, and ketones, and is comprised in the composition with an amount of between 1 and 10 wt.-%, based on the total composition.

In particularly preferred embodiments of the polyurethane composition according to the invention, the solvent SL is selected from the group consisting of carboxylic acid esters, in particular methyl acetate, ethyl acetate, butyl acetate, isopropyl acetate, 1-methoxy-2-propyl acetate and 3-methoxy-n-butyl acetate, ketones, in particular acetone, butanone, methyl ethyl ketone and methyl isobutyl ketone, acetals, especially ethylal, and aromatic hydrocarbons, especially xylene, toluene and ethylbenzene, as well as mixtures of these solvents.

Further Ingredients

Apart from the above mentioned ingredients, the inventive one-part polyurethane composition may optionally contain further additives. Such additives are commonly used, if desired, and typically known to the persons skilled in the art. Examples of optional further additives include pigments, such as inorganic and organic pigments, e.g. Bayferrox® and Heucosin®; dryers, such as, for example, molecular sieves, calcium oxide, highly reactive isocyanates such as p tosyl isocyanate, orthoformic esters, alkoxysilanes such as tetraethoxysilane, organoalkoxysilanes such as vinyltrimethoxysilane, and organoalkoxysilanes which have a functional group in alpha position to the silane group; adhesion promoters, especially organoalkoxysilanes, referred to below as "silanes", such as, for example, epoxysilanes, vinylsilanes, (meth)acrylosilanes, isocyanatosilanes, carbamatosilanes, S-(alkylcarbonyl)-mercaptosilanes, and aldiminosilanes, and also oligomeric forms of these silanes; stabilizers against heat, oxidation, light, and UV radiation; flame retardants; surface-active substances such as, for example, wetting agents, flow control agents, deaerating agents or defoamers, such as solvent free and silicon free defoamers, e.g. solvent free and silicon free polymer-based defoamers, and polyorganosiloxanes, e.g. Tego® Airex and Efka®; and emulsifiers such as calcium hydroxide; biocides, such as algicides, fungicides or fungal growth inhibitors, for example;

and also further substances customarily employed in one-part polyurethane compositions and well-known to the person with average skill working in the field of polyurethane formulation.

It is advantageous to select all the mentioned components optionally present in the composition, particularly filler and catalysts, in such a manner that the storage stability of the composition is not influenced negatively by the presence of such a component, which means that this composition undergoes no change or only little change during storage, in terms of its properties, particularly the application and curing properties. Consequently, reactions leading to chemical curing of the described composition, particularly reactions of the remaining isocyanate groups, for example with water, should not occur to a significant extent during storage. It is therefore particularly advantageous that the mentioned components contain or release no or at most only traces of water during storage. Therefore it can be advantageous to chemically or physically dry certain components before mixing them in the composition.

Therefore, the above-described inventive composition is preferably prepared and stored in airtight containers with exclusion of moisture. Typically, the composition is stable during storage, which means that it can be stored for a time period from several months to one year and longer, with exclusion of moisture, in an appropriate packaging or arrangement, such as, for example, a drum, a pouch or a cartridge, without undergoing any change, in terms of its application properties or its properties after curing, to an extent of relevance for its use. Usually, the storage stability is determined by measuring the viscosity or the push out force or extrusion force.

Another aspect of the present invention is the use of an inventive one-part polyurethane composition as an adhesive, sealant, or coating, preferably as a sealant.

In preferred embodiments of said use, the one-part polyurethane composition is applied at an ambient temperature of less than 5° C., preferably less than 0° C., in particular less than −5° C.

The composition according to the invention advantageously exhibits low extrusion force requirements, e.g. when applied out of manually or automatically operated cartridges, with required extrusion forces of less than 2300 N, in preferred embodiments less than 2000 N, in particular less than 1500 N, in most preferred embodiments less than 1000 N, when applied at −10° C. ambient temperature and after storage of the composition during 7 days at −10° C. This means that the composition according to the present invention can be applied even manually using cartridge guns at such low temperatures as −10° C., even when the composition itself is cooled down to said temperature. Of course, at higher temperatures, for example −5° C., or 0° C., or higher, the composition exhibits even lower extrusion force requirements.

Furthermore, the composition according to the present invention cures sufficiently fast and properly even at ambient temperatures as low as −10° C., which is surprising given the fact that air humidity is extremely low at such low temperatures. In these conditions, the composition exhibits a through cure of at least 5 mm after 7 days at −10° C., in preferred embodiments at least 5.5 mm, in most preferred embodiments at least 5.7 mm, or more. Of course, at higher temperatures, for example −5° C., or 0° C., or higher, the composition cures faster with higher through cure.

Another aspect of the present invention is a method for adhesively bonding, sealing, or coating a substrate, comprising the steps:
i) applying a one-part polyurethane composition as described above onto at least one substrate,
ii) curing the applied composition by means of humidity.

In preferred embodiments of said method, the one-part polyurethane composition is applied at an ambient temperature of less than 5° C., preferably less than 0° C., in particular less than −5° C.

Preferably, the humidity required in step ii) of above method is at least partially provided from the surrounding air.

The water needed for curing can originate either from air (atmospheric moisture), or the above-described composition can be contacted with a water-containing component, for example, by brushing, for example, with a smoothing agent, or by spraying, or a water-containing component can be added to the composition at the time of the application, for example, in the form of a water-containing paste which is mixed in, for example, using a static mixer. During the curing by atmospheric moisture, the composition cures from outside to inside. The curing rate is determined by various factors, such as, for example, the diffusion rate of the water, the temperature, the environmental moisture, and the adhesive geometry, and as a rule it decreases as the curing progresses.

In its application as an adhesive or selant, the moisture-curing composition is used for adhesively bonding or sealing a substrate S1 and a substrate S2.

An adhesive bonding method of this kind preferably comprises the steps of
i') applying the above-described composition to the substrate S1;
ii') contacting the applied composition with the substrate S2 within the open time;
iii') chemically crosslinking the composition with moisture; the substrate S2 being composed of the same or a different material from the substrate S1.

The substrate S1 may be the same as or different from substrate S2. Suitable substrates S1 or S2 are, for example, inorganic substrates such as glass, glass ceramic, concrete, mortar, brick, tile, plaster and natural stones such as granite or marble; metals or alloys such as aluminum, steel, non-ferrous metals, galvanized metals; organic substrates such as wood, plastics such as PVC, polycarbonates, PMMA, polyethylene, polypropylene, polyesters, epoxy resins; coated substrates such as powder-coated metals or alloys; and also paints and finishes, for example automobile topcoats. Where necessary, the substrates S1 and/or S2 may be pretreated before the above-described composition is applied. Such pretreatments include, in particular, physical and/or chemical cleaning techniques, examples being abrading, sandblasting, brushing or the like, or treatment with cleaners or solvents; or the application of an adhesion promoter, an adhesion-promoter solution or a primer; or a flame or plasma treatment, more particularly an air-plasma pretreatment at atmospheric ambient pressure.

Adhesive bonding of the substrates S1 and S2 by means of the above-described composition produces an adhesively bonded article. An article of this kind may be a built structure, more particularly a built structure in construction or civil engineering, or it may be an industrial good or a consumer product such as, for example, a window, a household appliance or a means of transport, such as a water or land vehicle.

For application of the above-described composition as an adhesive for elastic bonds, such as in vehicle construction, for example, the composition at the application temperature preferably has a paste like consistency with properties of structural viscosity. A paste like adhesive of this kind is applied to the substrate by means of a suitable apparatus. Suitable methods of application are, for example, application from commercially customary cartridges, which are operated manually or by means of compressed air, or from a drum or hobbock by means of a conveying pump or an extruder, optionally by means of an application robot. An adhesive on application preferably features sag resistance and short stringing. That is, it remains in the applied form following application, in other words does not run apart, and, after the application device has been set down, the adhesive forms very short strings, if any at all, so that the substrate and the application device are, as far as is possible, not fouled. Where the above-described composition is used as an adhesive for elastic bonds, the composition is applied preferably in the form of a bead having a substantially circular or triangular cross-sectional area.

The composition described above is applied preferably at low temperature, more particularly at 5° C. to −10° C. Alternatively, it may also be applied at room temperature or elevated temperatures, such as for example 25° C. to 50° C. The inventive composition is however suitable to be cured after application in a broad range of ambient temperatures. It cures conveniently at temperatures ranging from 5° C., or even below, up to temperatures of 50° C., or higher. The composition is especially developed for low temperature applications ranging from 5° C. to −10° C. or even lower. Temperatures below 0° C. do not significantly hamper the performance of the inventive composition. Care has to be taken, however, that in all cases sufficient humidity is present for the curing mechanisms to take place. This may depend on relative humidity from air, or additional humidity provided.

Another aspect of the present invention is a partially or completely cured one-part polyurethane composition as described above. Curing takes place under the influence of moisture, typically from air. Water reacts during the curing process with the remaining isocyanate groups to partially form primary amino groups, which then react further with other remaining isocyanate groups under formation of urea bonds.

Another aspect of the present invention is a manufacturing product comprising an inventive one-part polyurethane composition as described above.

The invention is further explained in the following experimental part, which, however, shall not be construed as limiting the scope of the invention.

EXAMPLES

Test Methods

Through cure, also known as curing depth and an indication for reactivity and curing speed, was determined with three samples of each composition applied at 23° C. and 50% r.h. The measurement itself was performed by applying the sample adhesive into a wedge channel with a length of 300 mm and a maximum depth of 10 mm, such that only the upper surface of the applied composition was facing the surrounding air. The sample was left curing at −10° C. during 7 days and subsequently, the partially cured sample was removed from the wedge by peeling back the cured portion and using a caliper to measure the lowest cured depth in the channel. The thickness of the cured layer in mm gave the through cure value. Values above 5 mm are considered acceptable, while values above 5.5 mm are considered excellent.

For the determination of the extrusion force each composition was filled in a cartridge. The cartridges were stored at −10° C. during 7 days. Then, while still at −10° C., the cartridges were opened and a nozzle of 3 mm inner diameter was mounted. With an extrusion instrument "Zwick Z005" the force in N was determined that was needed to extrude the composition at an extrusion velocity of 60 mm/min. The specified value is an average of the forces measured after 50 mm. After extrusion for 60 mm the experiment was stopped. Values below 2300 N are considered acceptable, while values below 2000 N are considered good, and values below 1000 N are considered excellent.

The isocyanate content of NCO-functional polymers or prepolymers was determined in % by weight (wt.-%) based on the total weight of the NCO-functional polymer by means of a back titration with excess di-n-butylamine and 0.1 M hydrochloric acid. All determinations were performed semi-manually on a Mettler-Toledo DL50 Graphix titrator with automatic potentiometric endpoint determination. For this purpose, 600-800 mg of the sample to be determined were dissolved under heating in a mixture of 10 ml of isopropanol and 40 ml of xylene, and then reacted with a solution of dibutylamine in xylene. Excess di-n-butylamine was titrated with 0.1M hydrochloric acid and the isocyanate content was calculated therefrom.

Preparation of Plasticizers PL

The viscosity was measured with a thermostated Rheotec RC30 cone-plate viscometer (cone diameter 25 mm, cone angle 1°, cone tip-to-plate distance 0.05 mm, shear rate 10 s-1).

Infrared (FT-IR) spectra were measured as undiluted films on a Nicolet iS5 FT-IR instrument from Thermo Scientific equipped with diamond crystal horizontal ATR measuring unit. The absorption bands are given in wavenumbers ($cm^{-1}$).

$^1$H NMR spectra were measured on a Bruker Ascend 400 spectrometer at 400.14 MHz; the chemical shifts δ are given in ppm relative to tetramethylsilane (TMS). Real and pseudo-coupling patterns were not distinguished.

Plasticizer PL1: Butanol-initiated acetylated PPG monol of average molecular weight $M_n$ of ca. 790 g/mol 120.00 g of butanol-initiated polyoxypropylene monol (Synalox® 100-20B, average molecular weight $M_n$ about 750 g/mol, from Dow) and 18.74 g of acetic anhydride were initially charged in a round bottomed flask having a distillation head under a nitrogen atmosphere. Then, the reaction mixture was stirred at 130° C. under a gentle stream of nitrogen to collect acetic acid as the distillate. Subsequently, the volatiles were removed from the reaction mixture at 80° C. and 10 mbar vacuum. This gave a clear, colorless liquid with a viscosity of 74 mPa·s at 20° C.

FT-IR: 2970, 2931, 2867, 1738, 1454, 1372, 1345, 1296, 1241, 1098, 1014, 959, 925, 866, 827.

$^1$H-NMR (CDCl$_3$): 5.02 (hept., 1H, CH$_2$(CH$_3$)CH-OAc), 3.75-3.34 (2×m, ca. 39H, OCH$_2$CH(CH$_3$)O), 3.33-3.28 (m, 2H, CH$_3$CH$_2$CH$_2$CH$_2$O), 2.04 (s, 3H, O(CO)CH$_3$), 1.55 (quint., 2H, CH$_3$CH$_2$CH$_2$CH$_2$O), 1.36 (sext., 2H, CH$_3$CH$_2$CH$_2$CH$_2$O), 1.22 (d, 3H, CH$_2$(CH$_3$)CH-OAc), 1.17-1.10 (m, ca. 36H, OCH$_2$CH(CH$_3$)O), 0.91 (t, 3H, CH$_3$CH$_2$CH$_2$CH$_2$O).

Preparation of Thixotropy Agent TX1

The thixotropy agent TX1 was prepared by charging 300 g of diisodecyl phthalate and 48 g of 4,4'-diphenylmethane diisocyanate (Desmodur® 44 MC L, from Covestro) in a vacuum mixer, followed by warming up slightly and then, with vigorous stirring, 27 g of monobutylamine were slowly added dropwise. The resulting paste was further stirred under vacuum and external cooling for one hour. The plasticizer diisodecyl phthalate is not chemically part of the thixotropy agent but was used as a reaction medium during preparation of the thixotropy agent.

Preparation of Polyurethane Polymers PU

Polymer PU1

727.0 g of polyether diol Acclaim® 4200 and 273.0 g of 4,4'-diphenylmethane diisocyanate (Desmodur® 44 MC L, from Covestro) were reacted by a known method at 80° C. to yield a polyetherurethane polymer having an NCO content of 7.6% by weight. %, a viscosity of 5.2 Pa·s at 20° C. and a content of monomeric 4,4'-diphenylmethane diisocyanate of about 18% by weight.

Subsequently, the volatile constituents, in particular a large part of the monomeric 4,4'-diphenylmethane diisocyanate, were removed by distillation in a short path compound (jacket temperature 180° C., pressure 0.1 to 0.005 mbar, condensation temperature 47° C.). The polyetherurethane polymer thus obtained had an NCO content of 1.8% by weight, a viscosity of 15.2 Pa·s at 20° C. and a content of monomeric 4,4'-diphenylmethane diisocyanate of 0.08% by weight.
Polymer PU2

725 g Desmophen® 5031 BT (glycerol-initiated ethylene oxide-terminated polyoxypropylene triol, OH number 28.0 mg KOH/g, OH functionality about 2.3, from Covestro) and 275 g 4,4'-diphenylmethane diisocyanate (Desmodur® 44 MC L, from Covestro) were reacted by a known method at 80° C. to yield a polyetherurethane polymer having an NCO content of 7.6% by weight, a viscosity of 6.5 Pa·s at 20° C. and a content of monomeric 4,4'-diphenyl-methane diisocyanate of about 20% by weight.

The volatile constituents, in particular the majority of the monomeric 4,4'-diphenylmethane diisocyanate, were subsequently removed by distillation in a short path compounder (jacket temperature 180° C., pressure 0.1 to 0.005 mbar, condensation temperature 47° C.). The polyetherurethane polymer thus obtained had an NCO content of 1.7% by weight, a viscosity of 19 Pa·s at 20° C. and a content of monomeric 4,4'-diphenylmethane diisocyanate of 0.04% by weight.
Polymer PU3

4051 g of polyoxypropylenepolyoxyethylenetriol (Caradol® MD34-02, Shell Chemicals Ltd., UK, OH number 35.0 mg KOH/g), 675 g of 4,4'-methylenediphenyl diisocyanate (4,4'-MDI; Desmodur® 44 MC L, Bayer MaterialScience AG) and 1172 g of diisodecyl phthalate (DIDP, Palatinol® Z, BASF SE, Germany) were reacted by a known method at 80° C. to give an NCO-terminated polyurethane polymer having a content of free isocyanate groups of 2.38% by weight.
Polymer PU4

400 g of a polyoxypropylene-diol (Acclaim® 4200, from Covestro AG, OH number 28.5 mg KOH/g) and 52 g of 4,4'-diphenylmethane diisocyanate (Desmodur® 44 MC L, from Covestro AG) were reacted by a known method at 80° C. to yield a liquid NCO-terminated polymer having an isocyanate group content of 1.85% by weight.
Polymer PU5

3241 g polyoxypropylene diol (Acclaim® 4200 N, Bayer MaterialScience AG, OH number 28.5 mg KOH/g), 1351 g polyoxypropylene polyoxyethylene triol (Caradol® MD34-02, Shell Chemicals Ltd., UK, OH number 35.0 mg KOH/g) and 395 g of tolylene diisocyanate (TDI, Desmodur® T 80 P, Bayer MaterialScience AG) were reacted at 80° C. to give an NCO-terminated polyurethane polymer having a content of free isocyanate groups of 1.47% by weight.

Example Compositions

A series of example compositions was prepared using the polyurethane polymers described above and the other synthesized compounds as described above. The compositions and their details are shown in Table 2.

Additional raw materials used are listed and described in Table 1.

For each composition C1 to C7, the ingredients shown in Table 2 were mixed well in the indicated amounts (weight percent based on the total individual composition) in Table 2 by means of a planetary mixer under vacuum and with exclusion of moisture and stored under exclusion of moisture. Several non-inventive reference (denoted "Ref.") and inventive example compositions were made from the raw materials in Table 1 and the aforementioned polyurethane polymers, plasticizer, and thixotropy agent, using the respective amounts as shown in Table 2.

Raw Materials Used in Example Compositions

TABLE 1

Additional raw materials used for example compositions.

| Abbreviation | Description |
|---|---|
| DIDP | Diisodecylphthalate (Jayflex ™ DIDP, ExxonMobil); viscosity >500 mPa s at 0° C.; plasticizer not according to the invention |
| DOA | Di-(2-ethylhexyl)adipate (Plastomoll ® DOA, BASF); viscosity <500 mPa s at 0° C.; plasticizer PL |
| TEG-EH | Tri(ethylene glycol) bis(2-ethylhexanoate) (Eastman ™ TEG-EH); viscosity < 500 mPa s at 0° C.; plasticizer PL |
| CaCO$_3$ | Ground natural calcium carbonate (Omyacarb ® 5 GU, Omya); filler F |
| Xylene | Isomeric mixture of o-xylene, m-xylene, and p-xylene; solvent SL |
| PTSI | p-Toluenesulfonyl isocyanate (Sigma Aldrich), drying agent |
| Catalyst | 0.4 wt.-% DMDEE and 0.4 wt.-% of a molar 1:1 blend of dibutyltin dichloride and butyltin mercaptide in DIDP; catalyst C |

TABLE 2

Compositions according to the invention and reference examples (Ref.). All numbers denote wt.-% based on the total individual composition.

| Experiment (all numbers in wt.-%) | C1 | C2 (Ref.) | C3 | C4 | C5 | C6 (Ref.) | C7 (Ref.) |
|---|---|---|---|---|---|---|---|
| Polymer PU1 | 15 | 15 | 15 | 15 | 15 | — | — |
| Polymer PU2 | 10 | 10 | 10 | 10 | 10 | — | — |
| Polymer PU3 | — | — | — | — | — | 18.75 | — |
| Polymer PU4 | — | — | — | — | — | 10 | — |
| Polymer PU5 | — | — | — | — | — | — | 25 |
| Plasticizer PL1 | 10 | — | — | — | 5 | 6.25 | 10 |
| DIDP | — | 10 | — | — | — | — | — |
| DOA | — | — | 10 | — | — | — | — |
| TEG-EH | — | — | — | 10 | — | — | — |
| CaCO$_3$ | 44.4 | 44.4 | 44.4 | 44.4 | 44.4 | 44.4 | 44.4 |
| Xylene | — | — | — | — | 5 | — | — |
| PTSI | 0.6 | 0.6 | 0.6 | 0.6 | 0.6 | 0.6 | 0.6 |
| Thixotropy agent TX1 | 18 | 18 | 18 | 18 | 18 | 18 | 18 |
| Catalyst | 2 | 2 | 2 | 2 | 2 | 2 | 2 |
| TOTAL | 100 | 100 | 100 | 100 | 100 | 100 | 100 |

Reference example C2 contains DIDP, a plasticizer that is not according to the invention.

Reference example C6 contains polymers P not according to the invention, since the polymers PU3 and PU4 are produced by a different method than specified in claim 1. They furthermore contain a too large amount of monomeric MDI.

Reference example C7 contains a polymer P not according to the present invention, since it is produced using TDI instead of MDI.

TABLE 3

Results of the extrusion force and through cure measurements as specified further above, "n/m" means that this value was not measured.

| Experiment | Extrusion force [N] | Through cure [mm] |
| --- | --- | --- |
| C1 | 1983.83 | 5.87 |
| C2 (Ref.) | 2458.80 | 4.79 |
| C3 | 1684.02 | 5.52 |
| C4 | 2206.94 | 5.75 |
| C5 | 753.12 | 5.72 |
| C6 (Ref.) | 2374.22 | 4.79 |
| C7 (Ref.) | n/m | 0 |

Table 3 shows that only the experiments according to the present invention are able to exhibit a low extrusion force of less than 2300 N at a very low temperature of −10° C. and furthermore a high through cure of more than 5 mm at the same low temperature. The reference composition based on TDI-based polymers (C7) does not cure at such low temperatures.

The invention claimed is:

1. A one-part polyurethane composition, comprising, based on the total composition:
   A) between 15 and 75 wt.-% of at least one isocyanate-functional polyurethane polymer PU;
   B) between 5 and 30 wt.-% of at least one organic thixotropy agent TX;
   C) between 2 and 25 wt.-% of at least one plasticizer PL having a viscosity of less than 500 mPa s, measured at 0° C. with a cone-plate viscosimeter, shear rate 10 s$^{-1}$, cone angle 1°, spindle 25-2, and a cone tip-plate distance of 0.05 mm;
   D) between 0 and 15 wt.-% of at least one solvent SL;
   E) between 0 and 50 wt.-% of at least one filler F; and
   F) at least one catalyst C for curing the polyurethane composition;
   wherein
   the isocyanate-functional polyurethane polymer PU has an NCO content in the range of 0.8% to 2.5% by weight;
   the isocyanate-functional polyurethane polymer PU consists of at least one polyurethane polymer that is obtained from the reaction of methylene diphenyl diisocyanate (MDI) and a polyol P, wherein the polyol P consists of a polyether polyol, in an NCO/OH ratio of at least 3/1 and subsequent removal of a major part of the non-reacted MDI by means of a suitable separation process; and
   the polyol P has a viscosity, measured according to ASTM D4878-15 at 25° C., of less than 2000 mPa s; and
   the isocyanate-functional polyurethane polymer PU has a remaining content of MDI of at most 0.5% by weight.

2. The one-part polyurethane composition according to claim 1, wherein the plasticizer PL is contained in the composition with an amount of between 4 and 20 wt.-%, based on the total composition.

3. The one-part polyurethane composition according to claim 1, wherein the organic thixotropy agent TX is obtained from the reaction of a diisocyanate with a monoalkyl amine and wherein the thixotropy agent TX is essentially free of isocyanate groups.

4. The one-part polyurethane composition according to claim 3, wherein the thixotropy agent TX is the reaction product of MDI and N-butylamine, suspended in a plasticizer.

5. The one-part polyurethane composition according to claim 1, wherein the composition comprises the filler F, one or more selected from the group consisting of carbon black, chalk, clay powder, and polyvinyl chloride powder, with an amount of between 5 and 45 wt.-%, based on the total composition.

6. The one-part polyurethane composition according to claim 1, wherein the composition comprises the solvent SL, one or more selected from the group consisting of aliphatic or aromatic hydrocarbons, aliphatic carboxylic acid esters, ethers, and ketones, with an amount of between 1 and 10 wt.-%, based on the total composition.

7. The one-part polyurethane composition according to claim 1, wherein the polyether polyol is a polyether diol and/or a polyether triol.

8. The one-part polyurethane composition according to claim 1, wherein the plasticizer PL has a polyether structure having no functional groups that spontaneously react with isocyanates and/or water.

9. The one-part polyurethane composition according to claim 1, wherein the plasticizer PL is an ester of a linear, branched, or cyclic aliphatic polyol that optionally contains ether groups, wherein all hydroxyl groups are converted to ester groups.

10. An adhesive, sealant, or coating method comprising applying the one-part polyurethane composition according to claim 1 on a substrate.

11. The method according to claim 10, wherein the one-part polyurethane composition is applied at an ambient temperature of less than 5° C.

12. A method for adhesively bonding, sealing, or coating a substrate, comprising the steps:
   i) applying the one-part polyurethane composition according to claim 1 onto at least one substrate, and
   ii) curing the applied composition by means of humidity.

13. The method according to claim 12, wherein the one-part polyurethane composition is applied at an ambient temperature of less than 5° C.

14. The method according to claim 12, wherein the humidity is at least partially provided from the surrounding air.

* * * * *